3,714,121
ARYLAMINE-MODIFIED PHENOLIC
RESOLE RESINS
Erwin H. Kobel and Harry A. Smith, Midland, Mich.,
 assignors to The Dow Chemical Company, Midland,
 Mich.
No Drawing. Filed Apr. 29, 1971, Ser. No. 138,746
Int. Cl. C08g 5/18
U.S. Cl. 260—51.5                                14 Claims

ABSTRACT OF THE DISCLOSURE

Phenol-aldehyde resins are modified by reaction with aniline or a substituted aniline and a difunctional arylamine such as m-hydroxyaniline in specified proportions. The resinous products combine fast curing with good physical properties as wood adhesives. Cure time of the resins is conveniently adjusted by varying the proportions of formaldehyde and a polyepoxide in a mixed curing agent composition.

BACKGROUND OF THE INVENTION

This invention relates to a method for modifying phenolic resins by reacting them at an intermediate stage with a particular combination of arylamines. It also relates to the curable modified resins thereby produced, to a method for adjusting the rate of cure of such resins, and to the bonded products wherein these resins constitute the adhesive bond.

Phenolic-aldehyde resins, usually phenol-formaldehyde resins, have been modified in the past by replacing part of the phenol in a conventional resin reaction mixture by aniline. Such modified resins possess valuable properties which make them particularly useful in molding compositions for electrical applications. United States patents in this area include Bender, 1,955,731, Nagel, 2,554,262, and Gleim, 2,630,420. It is also known to use a difunctional aromatic amine such as hydroxyaniline or phenylenediamine as the amine component in making such resins. Such amine-modified resins are described in German Offenlegungschriften 2,021,794 and 2,021,759. These amine-modified resins have desirably short curing times but tend to be rigid and sensitive to impact.

Also of interest in this area of art is LeBlanc, U.S. 3,558,559 which discloses dicarboxylic acid derivatives of aniline-modified novolacs.

SUMMARY OF THE INVENTION

It has now been discovered that resins having relatively short curing times and producing cured resins of improved toughness and resistance to physical shock are produced by reacting a phenolic-aldehyde resole with a combination of (1) aniline, a ring substituted lower alkylaniline, a lower alkoxyaniline, or a mixture thereof and (2) at least one difunctional arylamine of the formula

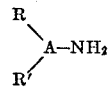

wherein A represents a benzene ring, a naphthalene nucleus, or a dicyclic moiety of the formula

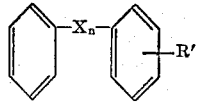

wherein X is oxygen, lower alkylidene, S, SO$_2$, or NH, $n$ is zero or one, R is OH or NH$_2$, and R' is H, lower alkyl, or lower alkoxy, the terms lower alkyl, lower alkoxy, and lower alkylidene being defined as of 1–4 carbon atoms. In a dicyclic difunctional amine as defined by the formulas above, the functional groups, i.e. the two amino groups or the amino and hydroxyl groups as the case may be, can both be substituted on the same aromatic ring or each ring may have one of these substituents. Improved resin products are obtained when about 0.1–1.3 moles of aniline or substituted aniline are employed per mole of difunctional amine and the total amine reactants amount to about 0.05–0.5 g. mole per 100 grams of resole. When higher proportions than specified above of aniline to difunctional amine are used, the resin produced has properties similar to one made with aniline alone.

DETAILED DESCRIPTION

Resoles are condensation polymers characterized by the presence of a plurality of reactive alkylol groups, methylol groups when formaldehyde is used, attached to the phenolic ring or rings of the resole molecule. There may also be some bisphenol type structure resulting from bridging methylene or substituted methylene groups between phenolic rings. Substantially any resole, i.e., a phenolic-aldehyde resin produced by base or essentially neutral catalyst initiated reaction of a phenol with up to slightly more than a mole equivalent of aldehyde, using phenol alone, a substituted phenol having at least two of the ortho and para ring positions on the aromatic ring capable of reaction with an aldehyde, or a mixture of phenol with such a substituted phenol, can be used as the starting material or prepolymer in the process of this invention. Preferably, phenol or a mixed phenolic reactant containing at least ten mole percent of phenol is used to make the starting resole. Representative aldehydes are monofunctional aldehydes and the more common examples of these include formaldehyde, acetaldehyde, propionaldehyde, furfuraldehyde, and benzaldehyde while phenol, cresol, methoxyphenol, ethoxyphenol, and tert-butylphenol are representative of phenolic reactants. The resole is preferably that obtained by reacting about 0.55–1.1 mole of formaldehyde with a mole of phenol in the presence of an essentially neutral or basic catalyst. The term "essentially neutral catalyst" is used to define those catalysts whose water solutions have a pH of about 4–7, for example, divalent metal salts of weak organic acids. The catalysts are generally ortho-directing in their effect. Typical examples are calcium acetate, zinc benzoate, manganese acetate, and similar salts of magnesium, cadmium, and ferrous ion. Basic catalysts include the alkali and alkaline earth metal oxides and hydroxides and also organic bases such as amines.

The arylamine-resole reaction can be carried out at any temperature from about 80° C. to the boiling point of the reaction mixture. The reaction is preferably run at about reflux temperature, usually for a reaction time of 0.5–5 hours.

Although the combined aryl monoamine and difunctional amine can be reacted with the resole in one step, preferably the amines are reacted separately with the aniline or monosubstituted aniline-resole reaction carried out first and then the difunctional amine reacted with the product under generally similar conditions. Preferred proportions of amines are about 0.8–1.2 moles of monoamine per mole of difunctional amine and about 0.25–0.45 g. mole of total amines per 100 grams of resole. Best results are found when the ratio of monoamine to difunctional amine is 0.8–1 mole per mole.

Aniline is the preferred monoamine reactant, but similar results are obtained with lower alkylanilines, lower alkoxyanilines, or mixtures of any of these. Representative substituted anilines are toluidine, p-tert-butylaniline, p-anisidine, o-ethoxyaniline, p-butoxyaniline, and the like.

Preferred difunctional amines include m-hydroxyaniline, m-phenylenediamine, p,p'-oxydianiline, p,p'-methylenedianiline, and p,p'-diaminodiphenylamine. Other such difunctional amines which can be used are p,p'-sulfonyldianiline, p,p'ethylidenedianiline, p,p'-thiodianiline, 4,4'-methylenebis(m-toluidine), 4,4' - butylidenebis(m - anisidine), benzidine, o-tolidine, 1,5-diaminonaphthalene, 1-amino-2-naphthol, and the like. A mixture of two or more such difunctional amines can also be used.

The resinous products are cured or hardened to an infusible, insoluble state (i.e. insoluble in water or organic solvents) by further reaction with an aldehyde, usually formaldehyde or a formaldehyde donor. Other curing agents are polyepoxides or combinations of a polyepoxide with an aldehyde. Preferred curing agents are formaldehyde or a combination of formaldehyde and a polyepoxide such as a polyglycidyl ether of Bisphenol A, an epoxidized novolac, or the diglycidyl ether of a polyglycol. The resins are curable in this way at room temperature with curing times ranging from about a minute up to about an hour, depending upon the particular resin system and the kind of curing agent or combination of curing agents used. The curing time at room temperature, or at any other particular temperature, is conveniently varied by using different ratios of epoxide to formaldehyde in the curing agent, the ratio of resin to the formaldehyde in such a curing agent composition being the most critical factor. The ratio of epoxide to formaldehyde can vary between all epoxide and all formaldehyde but weight ratios of 10/1 to 1/1 epoxide/$CH_2O$ usually are most preferred.

Resin/curing agent ratios can be varied from 20/1 to 1/3 but are preefrably between 4/1 to 1/1.5 by weight. Cure time also varies according to dilution of the curing agent in an inert solvent. Cure time varies inversely with the curing temperature. A curing temperature below normal temperature, as low as —40° C., for example, is also operable although the cure time is then somewhat longer. Slightly faster cures are obtained at higher temperatures, at 150° C., for example.

As compared to analogous resins modified with difunctional aromatic amine alone, the resins of this invention offer more versatility in that they provide broader ranges of curing rates which can be adjusted conveniently to a desired level by one or more variables such as proportion of formaldehyde or epoxide in the curing agent or by changes in the curing temperature as described above. In contrast, these variables have only limited effect on the curing rate of the difunctional amine resins. Additionally, such analogous resins when used as wood adhesives require priming of the wood surfaces to be bonded by precoating those surfaces with another phenoplast such as a resorcinol-formaldehyde resin for best results, particularly when the bond may be exposed to water. The present resins require no such priming and can be applied directly to give superior bonds.

The products of this invention are valuable adhesives for use in making water-resistant bonds in plywood manufacture or, preferably, in view of their curing characteristics, in other construction with wood. For example, these fast curing resins can be used in place of nails to bond structural members such as studs to sills, siding to wall members, flooring to floor beams or subflooring, and molding to wall and floor junctions. These resins also provide strong and impact-resistant bonds to cement blocks, bricks, foamed polystyrene, ceramic foams, and other building materials such that after curing the bonds at room temperature for 24 hours, or substantially less time in some cases, the substrates will usually fail under stress before the bonds break.

EXAMPLES 1–5

A predominantly ortho substituted resole prepolymer was prepared by refluxing for about two hours a mixture of phenol and paraformaldehyde, phenol/formaldehyde mole ratio=1.18/1, about 10% of water, and about 1% of calcium acetate monohydrate, both based on the weight of the reaction mixture. Aliquots of the resulting reaction mixture were then reacted with various aromatic amines and tested as described.

A mixture of 100 g. of the above prepolymer reaction product and 14.2 g. of aniline was stirred at reflux temperature for 2 hours, then 16.7 g. of m-hydroxyaniline was added and refluxing was continued for another hour. The cooled product represented a nearly quantitative yield of resin made using a 1:1 molar ratio of aniline to m-hydroxyaniline and a ratio of 0.305 g. mole of total amine to 100 grams of prepolymer. The same procedure was used to make another batch of essentially the same resin which was cured slightly differently, see Table 1.

The above procedure was repeated using as the aromatic amine component a 1:2 molar ratio of aniline to m-hydroxyaniline, a 1:1 molar ratio of aniline to p,p'-methylenedianiline, a 1:1 molar ratio of aniline to p,p'-oxydianiline, and a 1:1 molar ratio of p-anisidine to m-hydroxyaniline. Corresponding resins outside the scope of the present invention were made for purpose of comparison using aniline alone, m-hydroxyaniline alone, and a 2:1 molar ratio of aniline to m-hydroxyaniline as amine reactants.

These resins were compared for their room temperature cure rates by ASTM D–2471–68 gel time test, using a mixture of a polyglycidyl ether of Bisphenol A (mol. wt. about 380) and a 55% solution of formaldehyde in 75% aqueous methanol as the curing agent with a resin to curing agent weight ratio of 2:1. The results listed in Table 1 compare the cure rates (gel times) of the mixed amine resins of the present invention (resins 1–5) with those of related resins A, B, and C which are outside the scope of the invention. The effect of epoxide/formaldehyde ratio in the curing agent on gel time is also shown, note particularly resins 1 and 1a.

TABLE 1

| Resin designation | Amine reactant | | Curing agent epoxide/ HCHO | Gel time, minutes |
|---|---|---|---|---|
| | Components | Mole ratio | | |
| 1 | Aniline-m-hydroxyaniline | 1:1 | 1:1 | 1.75 |
| 1a | do | 0.94:1 | 7:1 | 27 |
| 2 | do | 0.5:1 | 1:1 | 1.5 |
| 3 | Aniline-p,p'-methylenedianiline | 1:1 | 7:1 | 46 |
| 4 | Aniline-p,p'-oxydianiline | 1:1 | 7:1 | 30 |
| 5 | p-Anisidine-m-hydroxyaniline | 1:1 | 7:1 | 13 |
| A | Aniline only | | 1:1 | [1] 17 |
| B | m-Hydroxyaniline only | | 1:1 | 0.75 |
| C | Aniline-MHA | 2:1 | 1:1 | 44 |

[1] Hours.

The resins of the foregoing examples were subjected to testing as wood adhesives using standard test methods ASTM D–1344–57 (a cross-lap test), some to ASTM D–950–54 (an impact test), and accelerated weathering test CS–253–63 referred to herein as the vacuum pressure test. In the cross-lap tests, the test pieces were made up by spreading excess resin adhesive composition on a piece of fir one inch wide by one half inch thick and about three inches long. A similar piece of wood was immediately laid over the coated piece with the grain directions at right angles and 2–3 lbs. per square inch pressure was applied for 24 hours, surplus resin being squeezed out of the joint. The joint is then broken under tension and the bond strength recorded. The vacuum pressure test is a variation of the cross-lap test wherein the bonded sample is exposed to at least 635 mm. Hg vacuum while submerged in water at 25° C. for 30 minutes and then exposed to about 4 atmospheres of air pressure under the same time and temperature conditions. The sample is then tested wet using the cross-lap test. Results are listed in Table 2. Douglas fir was the wood used in all tests and the test data represent the ranges or averages found in each test for a set of at least three samples, figures for both strength of bond and percent wood failure at break (in parentheses) being listed.

The relative weakness of bonds obtained with the amine-modified resins A, B and C which are outside the scope of the invention is apparent. All of the bonds were made with no preliminary priming of wood surfaces with other materials. Consequently, the m-hydroxyaniline modified resin B showed excessive loss of bond strength when wet in the vacuum-pressure test.

TABLE 2

| Resin designation | Cross-lap, lbs./sq. in. (percent wood failure) | Vacuum-pressure, lbs./sq. in. (percent wood failure) | Impact, ft. lbs./sq. in. |
|---|---|---|---|
| 1 | 200->300 (100) | 140-244 (100) | ≥12 |
| 1a | 240-294 (100) | 140-244 (100) | --- |
| 2 | 172-275 (80-90) | 150 (10) | >10 |
| 3 | 200-300 (50) | 235-302 (10-20) | --- |
| 4 | 285-342 (80) | 189-199 (10) | --- |
| 5 | 215-272 (10-50) | 145-218 (0-10) | --- |
| A | [1] 18 | --- | --- |
| B | 83-186 (0-100) | 37-93 (0) | 8 |
| C | [2] 131-170 (0) | --- | --- |

[1] After 1 week.
[2] Tacky.

EXAMPLE 6

A conventional resole was prepared by reacting equal molar proportions of formaldehyde and phenol in the presence of aqueous base (0.33 g. mole NaOH per mole of phenol). The resole resin thereby obtained was reacted with aniline and m-hydroxyaniline in equal molar proportions using the amine/prepolymer ratio and the reaction procedure of Example 1a. The product was cured with a 7/1 epoxide/55% methanolic formaldehyde mixture as previously described and tested as a wood adhesive as before. Results are listed in Table 3 with the corresponding data for Resin 1a included for purpose of comparison.

TABLE 3

| Resin designation | Gel time, minutes | Cross-lap test, lbs./sq. in. percent wood failure) | Vacuum-pressure test lbs./sq. in. (percent wood failure) |
|---|---|---|---|
| 6 | 16 | 135-234 (30-100) | 124 (10) |
| 1a | 27 | 240-294 (100) | 140-244 (100) |

Comparable results are obtained when the difunctional amine reactant in the foregoing examples is replaced by an equivalent quantity of m-phenylenediamine, p,p'-diaminodiphenylamine, or other such difunctional amine as previously defined. Similarly, when the aryl monoamine reactant in the above examples is m-toluidine, p-tert-butylaniline, o-ethoxyaniline, or other such mono-substituted aniline, the curable resinous products have much the same properties as those described. In the same way, although formaldehyde and phenol are preferred reactants to make the resole prepolymer, resoles made from other aldehydes and phenols as previously defined are operable in the process of the invention to make generally similar curable resin adhesives.

EXAMPLE 7

Example 7 illustrates the manner and degree by which curing times of these resin compositions are varied by using different epoxide/formaldehyde combinations and different ratios of resin to curing agent.

A curable resin was made up according to the procedure of Example 1 but using aniline and m-hydroxyaniline in the proportions of Example 1a, i.e., in a mole ratio of 0.94/1. Methanol (9% by weight) was added to the resin and samples were then cured at room temperature (25° C.) with various curing agent combinations of the same polyglycidyl ether of Bisphenol A, epoxy equivalent weight 186-192, and 55% aqueous methanolic formaldehyde. Five grams of curing agent combination were used for 10 g. of resin. The cured resin samples were subjected to the wood adhesive test described in Examples 1-5 and Table 2.

TABLE 4

| Moles epoxy group/mole HCHO | Weight ratio, resin/HCHO | Gel time, minutes | Cross-lap test, lbs./sq. in. |
|---|---|---|---|
| 0.58 | 4 | 1 | 60-115 |
| 1.16 | 6 | 2 | 195-210 |
| 1.74 | 8 | 4 | 185-250 |
| 2.34 | 10 | 8 | 230-310 |
| 2.92 | 12 | 22 | 215-280 |
| 3.6 | 14 | 26 | 250-270 |
| 4.0 | 16 | 29 | 240-295 |
| 4.8 | 18 | 35 | 180-260 |
| 5.8 | 22 | 43 | 160-260 |
| 8.8 | 32 | 47 | 190-230 |
| 11.6 | 42 | 51 | 195-210 |

EXAMPLE 8

Somewhat shorter gel (cure) times were obtained when the resin of Example 7 was cured by the same procedure using mixtures of methanolic formaldehyde and an epoxidized novolac made by reacting a novolac with epichlorohydrin, epoxy equivalent weight=172-179. One part by weight of total curing agent was used per two parts of resin in each case. This effect is shown by the data in Table 5.

TABLE 5

| Moles epoxy group/mole HCHO | Gel time, minutes | Cross-lap test, lbs./sq. in. |
|---|---|---|
| 0.31 | 0.5 | 250 |
| 2.2 | 13 | 310 |
| 4.7 | 34 | 210 |

The ratio of resin to formaldehyde is the principal factor determining the cure time of the resin, but the proportion of epoxide and the dilution effect obtained by using more or less methanol in the curing composition both have lesser effects on cure time. The cure time varies directly with both the proportion of epoxide and the relative quantity of solvent.

EXAMPLES 9-11

Other resins of this invention show similar variation of cure time with changes in the amount and composition of epoxide-formaldehyde curing agent as shown in Examples 7 and 8. The tests of Table 6 were carried out using the curing agent, the proportion of total curing agent to resin, and the procedure described in Example 7. The resins of Examples 1a and 8 are included for comparison.

TABLE 6

| Resin of Ex. No. | Mole ratio epoxide group/HCHO | Gel time, minutes | Cross-lap test, lbs./sq. in. |
|---|---|---|---|
| 1a | 2.34 | 8 | 230-310 |
|  | 4.0 | 29 | 240-295 |
| 3 | 2.34 | 49 | --- |
|  | 4.0 | 46 | 200-300 |
|  | 8.8 | 54 | --- |
| 4 | 2.34 | 21 | --- |
|  | 4.0 | 30 | 285-342 |
| 5 | 2.34 | 4 | --- |
|  | 4.0 | 13 | 215-272 |
|  | 8.8 | 22 | --- |
| 8 | 0.31 | 0.5 | 250 |
|  | 2.2 | 13 | 310 |
|  | 4.7 | 34 | 210 |

The ratio of resin to formaldehyde is most critical in determining the cure time of the resin composition and the amount of epoxide present in the curing additive has a lesser but still a significant effect. The resins of this invention differ in this respect from analogous resins where the amine component is difunctional aromatic amine only. The latter resins show little or no change in cure time when the quantity of epoxide in the curing additive is varied and the amount of formaldehyde is held constant.

The effects of different proportions of resin to curing agent, curing agent composition, and dilution with methanol on the cure times and wood adhesive properties of the resins of this invention are shown in detail in Examples 12–16. A phenol-formaldehyde resole modified by reacting it with aniline and with m-hydroxyaniline, aniline:m-hydroxyaniline mole ratio=1:1, as described in Example 1 was used to illustrate these effects. The variations in properties with changes in curing agent are typical of those found with other resins of the present invention.

EXAMPLES 12–13

A phenol-formaldehyde resole was modified by reaction with aniline and m-hydroxyaniline in equal molar proportions as described in Example 1. The resulting resin was mixed with 9% by weight methanol and samples were cured at 25° C. with various combinations of polyglycidyl ether of Bisphenol A, epoxy equivalent weight 186–192 and 55% aqueous formaldehyde, holding a constant resin/formaldehyde ratio while varying the proportion of epoxide. In Table 7, a resin/formaldehyde weight ratio of 6/1 was employed while in Table 8 the corresponding ratio was 16/1. The longer cure times with increasing epoxide are evident as well as the shorter cure times in the series where more formaldehyde was used in the curing agent combination. Cross-lap and gel time tests were made on each resin-curing agent composition according to the procedures previously described.

TABLE 7.—RESIN/FORMALDEHYDE=6/1

| Weight ratio, epoxide/resin | Gel time, minutes | Cross-lap test, lbs./sq. in. |
|---|---|---|
| No epoxide | 1.25 | 100–140 |
| 0.2 | 1.5 | 100–110 |
| 0.33 | 2 | 195–210 |
| 0.4 | 4 | 170–270 |
| 0.6 | 6 | 100–170 |
| 0.8 | 9 | 80–105 |
| 1.0 | 15 | 75–115 |

TABLE 8.—RESIN/FORMALDEHYDE=16/1

| Weight ratio, epoxide/resin | Gel time, minutes | Cross-lap test, lbs./sq. in. |
|---|---|---|
| No epoxide | (1) | |
| 0.2 | 11.5 | 175–270 |
| 0.4 | 18 | 290–310 |
| 0.6 | 20 | 195–310 |
| 0.8 | 23 | 270–280 |
| 1.0 | 29.5 | 180–285 |

1 No cure obtained.

EXAMPLES 14–15

Tests using the same materials and procedures described in Examples 12–13 were run wherein the epoxide reactant was held constant and the proportion of formaldehyde was varied.

TABLE 9.—RESIN/EPOXIDE=1/1

| Weight ratio formaldehyde/resin | Gel time minutes | Cross-lap test, lbs./sq. in. |
|---|---|---|
| No formaldehyde | 120 | 65–80 |
| 0.063 | 29.5 | 180–295 |
| 0.1 | 17 | 95–130 |
| 0.167 | 15 | 75–115 |

TABLE 10.—RESIN/EPOXIDE=2.5/1

| Weight ratio formaldehyde/resin | Gel time minutes | Cross-lap test, lbs./sq. in. |
|---|---|---|
| No formaldehyde | 72 | 105–205 |
| 0.063 | 18 | 290–310 |
| 0.167 | 4 | 170–270 |

EXAMPLE 16

The cure time of resins of the present invention also vary with th proportion of methanol in the resin-curing agent composition. Using the resin-curing agent composition of Examples 12–15 wherein the resin/curing agent ratio was held at 2/1 and the epoxide/formaldehyde weight ratio was constant at 7/1, tests as before were run wherein the total methanol present in the system was varied as shown. Methanol concentrations of about 6–15% are about the quantities of this inert diluent normally encountered when methanolic formaldehyde is used as a curing agent.

TABLE II

| Weight percent methanol | Gel time, minutes | Cross-lap test, lbs./sq. in. |
|---|---|---|
| 2 | 14 | 240–325 |
| 9 | 20–25 | 145–290 |
| 13.5 | 29 | 295 |
| 22.5 | 48 | |
| 50 | 330 | |

We claim:
1. A process for making an amine-modified phenolic resin which comprises reacting by contacting at about 80° C. to the boiling point of the reaction mixture a phenolic resole resin, wherein said resole is the essentially neutral or basic catalyst-initiated reaction product of 0.55–1.1 mole of formaldehyde with a mole of phenol, with (1) an aryl monoamine which is aniline, a nuclearly monosubstituted aniline wherein the substituent is lower alkyl or lower alkoxy, or a mixture thereof and (2) at least one difunctional aromatic amine of the formula

$$\begin{array}{c} R \\ \diagdown \\ \phantom{R'}A\text{—}NH_2 \\ \diagup \\ R' \end{array}$$

wherein A is a benzene ring or a moiety of the formula $$\bigcirc\text{—}X_n\text{—}\bigcirc\text{—}R'$$

werein X is oxygen, lower alkylidene or —NH— and $n$ is 1, R is —OH or —NH$_2$ and R' is lower alkyl, lower alkoxy, or H;-and wherein the molar ratio of the aryl monoamine to the difunctional amine is aobut 0.1:1 to about 1.3:1 and the total amount of amine reactants is about 0.05–0.5 g. mole per 100 grams of resole.

2. The process of claim 1 wherein the aryl monoamine is aniline.

3. The process of claim 1 wherein the aryl minoamine is p-anisidine.

4. The process of claim 2 wherein the difunctional aromatic amine is m-hydrooxyaniline, m-phenylenediamine, p,p'-methylenedianiline, p,p'-oxydianiline, or p,p'-diaminodiphenylamine.

5. The process of claim 1 wherein the aryl monoamine is first reacted with the resole and the difunctional amine is then reacted with the resulting reaction product.

6. The process of claim 1 wherein about 0.8–1.2 moles of aryl monoamine is employed per mole of difunctional amine and the total amount of amine reactants is about 0.25–0.45 g. mole per 100 grams of resole.

7. The process of curing the resin product of the process of claim 1 wherein said product is reacted with a polyepoxide, a formaldehyde donor, or a mixture thereof.

8. The process of claim 7 wherein 1–10 parts by weight of polyepoxide is present per part of formaldehyde in a mixed polyepoxide-formaldehyde curing mixture.

9. The process of claim 8 wherein the polyepoxide is a polyglycidyl ether of Bisphenol A.

10. An amine-modified phenolic resin which comprises the product of reaction at about 80° C. to the boiling point of the reaction mixture of a phenolic-aldehyde resole, wherein said resole is the essentially neutral or basic catalyst-initiated reaction product of 0.55–1.1 mole of formaldehyde with a mole of phenol, an aryl monoamine which is aniline, a nuclearly monosubstituted aniline wherein the substituent is lower alkyl or lower alkoxy, or a mixture thereof, and at least one difunctional aromatic amine of the formula

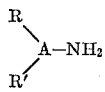

wherein A is a benzene ring or a moiety of the formula

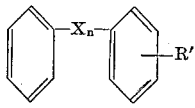

wherein X is oxygen, lower alkylidene or —NH—, $n$ is one, R is —OH or —NH$_2$, and R' is lower alkyl, lower alkoxy, or hydrogen and wherein the molar ratio of the aryl monoamine to the difunctional amine is about 0.1:1 to about 1.3:1 and the sum of the amine reactants is about 0.05–0.5 gram mole per 100 grams of resole.

11. The resin of claim 10 wherein the aryl monoamine is aniline.

12. The resin of claim 11 wherein the difunctional aromatic amine is hydroxyaniline, phenylenediamine, methylenedianiline, oxydianiline, or diaminodiphenylamine.

13. The resin of claim 12 wherein the difunctional aromatic amine is m-hydroxyaniline.

14. The reaction product of the resin of claim 10 and a phenolic resin curing agent which is a polyepoxide, a formaldehyde donor, or a mixture thereof.

References Cited

UNITED STATES PATENTS

| 2,082,306 | 6/1937 | Sutter | 260—51.5 |
| 3,342,776 | 9/1967 | Lambuth | 260—57 |
| 3,472,915 | 10/1969 | Rider | 260—59 X |
| 3,518,159 | 6/1970 | Freeman et al. | 260—51.5 X |

HOWARD E. SCHAIN, Primary Examiner

U.S. Cl. X.R.

161—262; 260—49, 831